United States Patent [19]

Arai

[11] Patent Number: 4,756,670

[45] Date of Patent: Jul. 12, 1988

[54] DETECTING METHOD AND APPARATUS USING HEAT SENSITIVE DEVICES

[75] Inventor: Christopher G. Arai, Danville, Calif.

[73] Assignee: Andros Analyzers Incorporated, Berkeley, Calif.

[21] Appl. No.: 920,530

[22] Filed: Oct. 17, 1986

[51] Int. Cl.⁴ .................. F04B 49/00; G01F 1/68; A61B 5/08

[52] U.S. Cl. .................. 417/43; 417/45; 73/204; 128/719

[58] Field of Search .................. 417/43, 45, 32, 53; 73/204; 128/719, 204.22

[56] References Cited

U.S. PATENT DOCUMENTS

| | | | |
|---|---|---|---|
| 2,947,938 | 8/1960 | Bennett | 73/204 X |
| 3,408,940 | 11/1968 | McGrogan | 417/43 X |
| 3,518,814 | 7/1970 | Maynard | 417/43 X |
| 3,597,676 | 8/1971 | Moore | 73/204 X |
| 3,683,692 | 8/1972 | Lafitte | 73/204 |
| 3,942,378 | 3/1976 | Olmstead | 73/204 |
| 4,067,320 | 1/1978 | Olsson et al. | 128/719 |
| 4,083,244 | 4/1978 | Agar et al. | 73/204 |
| 4,150,670 | 4/1979 | Jewett et al. | 128/204.22 |
| 4,180,734 | 12/1979 | Gedeon | 128/719 X |
| 4,384,578 | 5/1983 | Winkler | 73/204 X |
| 4,587,842 | 5/1986 | Handtmann | 73/204 |

FOREIGN PATENT DOCUMENTS 2398197  3/1979  France .................. 417/32

OTHER PUBLICATIONS

Robert A. Rasmussen; Application of Thermistors to Measurements in Moving Fluids; vol. 33, No. 1; Jan. 1962, pp. 38–42.

M. T. Pigott and R. C. Strum; Observed Behavior of a Thermistor Bed Flow Meter; vol. 38, No. 6; Jun. 1967, pp. 743–744.

Helmut Forstner and Klaus Rutzler; Two Temperature-Compensated Thermistor Current Meters for Use in Marine Ecology; vol. 27, No. 2; Mar. 1969, pp. 263–271.

Primary Examiner—William L. Freeh
Assistant Examiner—Paul F. Neils
Attorney, Agent, or Firm—Fitch, Even, Tabin & Flannery

[57] ABSTRACT

This invention relates generally to the sensing of phenomena using heat sensitive devices. More particularly, the invention relates to an improved method and system wherein the ratio of the dissipation coefficients of a pair of electrically heated matched temperature sensitive devices is detected, which method and system are insensitive to variation in ambient temperature.

15 Claims, 3 Drawing Sheets

DETECTING METHOD AND APPARATUS USING HEAT SENSITIVE DEVICES

This invention relates generally to the sensing of phenomena using heat sensitive devices. More particularly, the invention relates to an improved method and system wherein the ratio of the dissipation coefficients of a pair of electrically heated matched temperature sensitive devices is detected, which method and system are insensitive to variation in ambient temperature.

DESCRIPTION OF THE PRIOR ART

The use of heat sensitive devices for measuring phenomena such as fluid flow, pressure, and gas concentration, is known in the prior art. For example, thermistors have been utilized in the control and measurement of flowing fluids. By noting changes in the power dissipated in the thermistor as it is cooled by the flowing fluid, variations in the fluid flow may be derived.

One such system is described by Rasmussen (The Review of Scientific Instruments, Volume 33, Number 1, January, 1962). Rasmussen describes the use of a self-heated thermistor using constant temperature and constant current biasing, for measuring fluid flow. Unfortunately, in Rasmussen's constant current biasing system the voltage output is dependent upon the thermistor resistance, which can vary with ambient temperature. Since the current required to keep the thermistor at a constant temperature is a function of the difference between the thermistor temperature and the ambient temperature, variation in ambient temperature will introduce error in the relationship between output voltage and fluid flow.

In 1967, Pigott and Strum (The Review Scientific Instruments, Volume 38, Number 6, June 1967) described the construction of a thermistor flow velocity sensing system in which the thermistor is one leg of a DC Wheatstone bridge, and the bridge unbalance voltage is a measure of the flow velocity. The problem with the Pigott and Strum system is similar to that of the Rasmussen constant current system. The operating point of Pigott and Strum will float with the ambient temperature, causing the bridge voltage to float as well. Again, this introduces error to the flow measurement calibration.

Forsner & Rutzler (J. Marine Res. 27,263,1969) recognizing the non-linearity problem, attempted to remedy the problem by utilizing two thermistors. A sensing thermistor was placed in the flow of fluid and a reference thermistor was placed in a non-flowing region of the fluid, the latter for referencing the ambient temperature. Utilizing the Wheatstone bridge approach of Pigott and Strum, Forsner & Rutzler placed the thermistors in adjacent legs of the Wheatstone bridge. Since, theoretically, both sides of the bridge float with the ambient temperature, the bridge voltage should be free of the effects of ambient temperature changes. The problem with this scheme is that the thermistor resistance versus temperature curve is highly non-linear. Accordingly, even if the two thermistors in the bridge maintain a constant temperature difference while their absolute temperature changes, the difference in their resistances does not remain constant. Thus, at a given flow rate, changes in ambient temperature will cause the difference between the two resistances of the thermistors to vary, causing a change in the bridge voltage with resultant error.

It is an object of the present invention to provide an improved detecting method and system wherein a pair of electrically heated matched temperature sensitive devices are employed.

More specific object of the invention is to provide a fluid flow detecting system which is free of inaccuracies introduced as a result of variations in the ambient temperature of the fluid.

A more general object of the invention is to provide an improved detecting system.

SUMMARY OF THE INVENTION

Very generally, the invention is applicable to a detecting system wherein a pair of electrically heated matched temperature sensitive devices are positioned in thermally sensitive relation to a thermally measurable phenomenon, each device being sensitive to variations in ambient temperature but only one of said devices being positioned to be affected by the measurable phenomenon. A change in the phenomenon thereby results in a change in the ratio of dissipation coefficients of the devices. Change in the ratio of dissipation coefficients is indicated in a manner which is insensitive to variation in ambient temperature. In doing so, the temperature of the two devices is maintained equal and changes in the ratio of the power dissipation in one device with respect to the power dissipation in the other are detected. As a result, a change in the power ratio indicates a change in the dissipation coefficient ratio. The invention may be employed for control, measuring, monitoring, or other purposes where detection of changes in a particular phenomenon is desired.

DESCRIPTION OF THE DRAWINGS

Various objects and features of the invention will become apparent from the following description taken in connection with the accompanying drawing wherein.

DETAILED DESCRIPTION OF THE INVENTION

Figure 1:
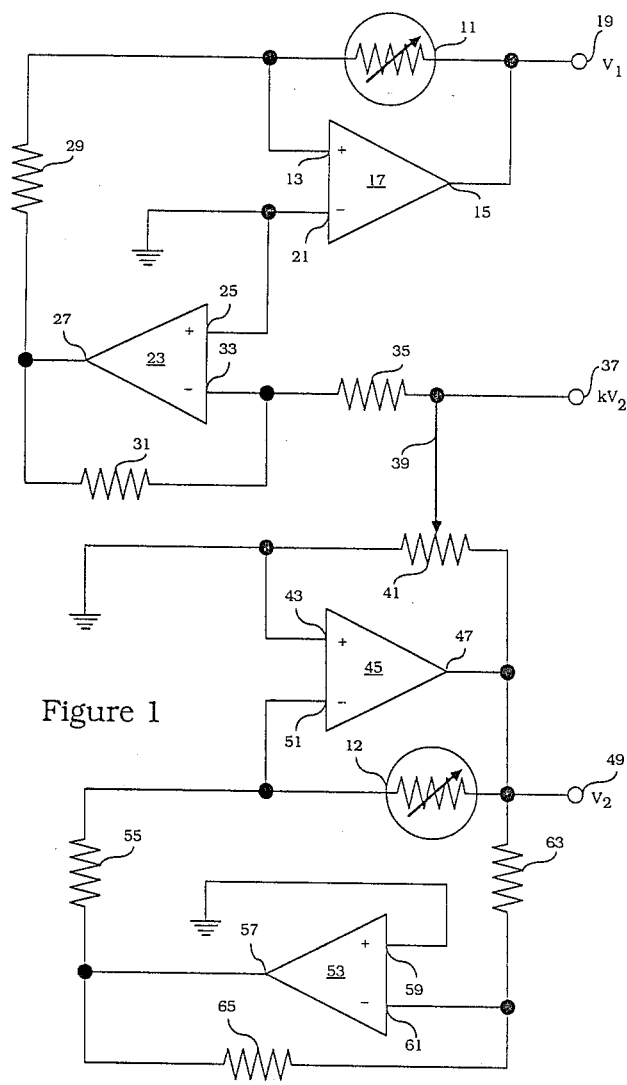
FIG. 1 is a schematic diagram of apparatus incorporating the invention.

Referring now more specifically to FIG. 1, a preferred form of the invention is shown. A thermistor 11, shown as a variable resistance, is placed in a position out of the flow of fluid to be measured but in thermal relation to the fluid such that the thermistor is affected by variation in ambient temperature. The thermistor 11 is connected across the negative input 13 and the output 15 of an operational amplifier 17. The output 15 of the amplifier 17 is coupled to an output point 19 which produces a voltage $V_1$. The positive input 21 of the amplifier 17 is connected to ground.

An operational amplifier 23, also having its positive input 25 connected to ground, has its output 27 connected through a resistor 29 to the negative input 13 of the amplifier 17. A resistor 31 is connected across the negative input 33 and the output 27 of the amplifier 23. A resistor 35 is coupled between an output point 37 and the negative input 33 of the amplifier 23. The output point 37 produces a voltage $kV_2$.

The output point 37 is connected to the tap 39 of a variable resistor 41 which is connected across the input terminal 43 and the output terminal 47 of an operational amplifier 45. The positive input terminal 43 is connected to ground and the output terminal 47 is connected to an output point 49 which produces a voltage $V_2$. A thermistor 12, shown as a variable resistor, is connected across the negative input terminal 51 and the output terminal 47 of the amplifier 45.

The output terminal 57 of an operational amplifier 53 is coupled to the thermistor 12 via a fixed resistor 55. The positive input terminal 59 of the amplifier 53 is grounded and the negative input terminal 61 of the amplifier 53 is connected via a resistor 63 to the output terminal 47 of the amplifier 45. A fixed resistor 65 is connected across the negative input terminal 61 and output terminal 57 of the amplifier 53.

In the circuit set out in FIG. 1, the thermistor 12 is positioned in the flow of the fluid to be measured. The thermistors 11 and 12 are selected to be matched in their characteristics. Accordingly, the resistance of the thermistor 11 and the resistance of thermistor 12 will be affected by changes in ambient temperature of the fluid to be measured. In addition, the resistance of the thermistor 12 will change in accordance with the rate of fluid flow. The current $I_1$ flowing in the thermistor 11 will be controlled in accordance with the voltage $kV_2$ at the terminal 37. Similarly, the current $I_2$ flowing in the thermistor 12 will be controlled in accordance with the voltage at the terminal 49.

Figure 3:
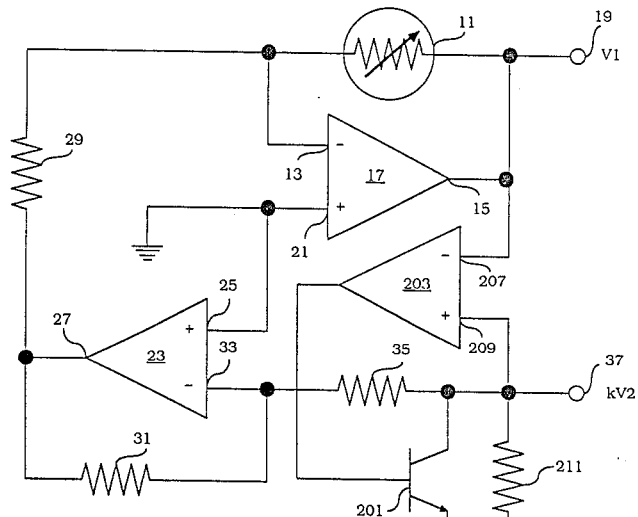
FIG. 3 is a schematic diagram of a further embodiment of the invention.
Figure 3:
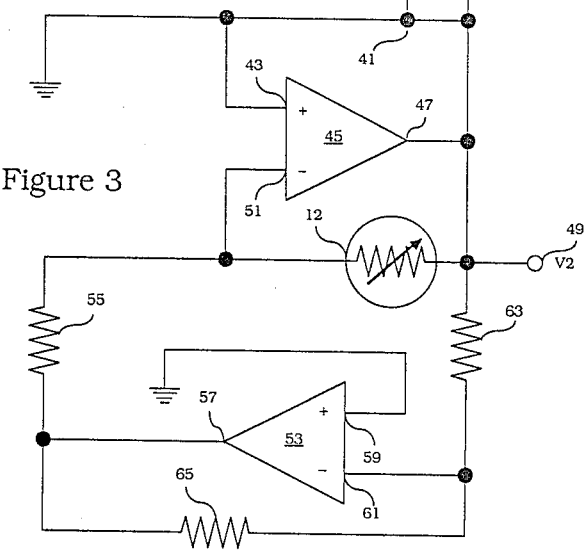

In accordance with the invention, the two matched thermistors 11 and 12 are maintained at the same temperature. This implies that the resistances of the respective devices are maintained equal. In order to meet this condition, the voltage at the terminal 19 is so driven as to be made equal to the voltage at the terminal 37. The current through the thermistor 11 is selected by the reduction of $V_2$ corresponding to the position of the tap 39 on the variable resistor 41 and by the ratio of the voltage $V_1$ to the current. By making $V_1$ equal to $kV_2$, (where k is determined by the position of the tap 39), then the resistances of the respective thermistors 11 and 12 are made equal. By using the terminals 19 and 37 to drive a servo loop to control fluid flow, the flow rate may be maintained constant. Changes in flow rate may be detected and measured by detecting changes in the relation between the voltages at the terminals 19 and 37. A circuit for doing this is shown in FIG. 3 and is described more fully below.

The circuit of the invention may be considered generally as comprising a separate servo loop for each of the thermistors 11 and 12. Each of the servo loops, driven by the operational amplifiers 23 and 53, respectively, is operated to maintain the temperature in the respective thermistors equal. A relationship between the voltage at the terminal 49 and the voltage at the terminal 19 is maintained by the setting of the tap 39. In the illustrated system of FIG. 1, any differences between the voltages measured at the terminals 37 and 19 are used to servo fluid flow such that the two voltages are made equal. Thus, the external servo loop maintains the ratio of the power dissipation in each of the thermistors 11 and 12 constant. As will be explained below, the ratio (k) of the power dissipation is equal to the square of the ratio of resistance determined by the positioning of the tap 39, provided the temperature of the two thermistors is equal. Under the condition where the temperatures are equal, k squared equals the ratio of the dissipation coefficient of the thermistor 12 to the dissipation coefficient of the thermistor 11 which is unaffected by variations in ambient temperature.

It will be apparent that the illustrated circuit will function with the thermistors reversed, that is, with the thermistor 11 in the flowing fluid and the thermistor 12 in the still fluid. In this case, k is greater than 1, requiring that the function of the pot 41 be replaced by an amplifier whose gain is exactly the inverse of k as shown in FIG. 1. In doing so the polarity of the signals at the terminals 19 and 37 will be reversed.

To see how the effect of ambient temperature is eliminated by holding the temperature of the two devices equal—the basis of the invention—an explanation of the theory is set out. To start, we look at the steady state equation of a device that is dissipating power (in this case a thermistor).

$$T = T_A + PD_C$$

where
 $T$ = device temperature
 $T_A$ = ambient temperature
 $P$ = power dissipation
 $D_C$ = dissipation coefficient.

In rearranging the expression, $D_C$ is more clearly defined.

$$D_C = \frac{T - T_A}{P}$$

Now in the case of two heat sensitive devices:

$$T_{11} = T_A + P_{11} D_{C11}$$

$$T_{12} = T_A + P_{12} D_{C12}$$

(where the numerical subscripts refer to the devices in FIG. 1). Now if the above equations are constrained as described by the invention, (i.e. $T_{11} = T_{12}$), then:

$$T_A + P_{11} D_{C11} = T_{11} = T_{12} = T_A + P_{12} D_{C12}$$

or $$T_A + P_{11} D_{C11} = T_A + P_{12} D_{C12}.$$

Since $T_A$ is the same for both devices, $$P_{11} D_{C11} = P_{12} D_{C12}$$

or $$\frac{D_{C12}}{D_{C11}} = \frac{P_{11}}{P_{12}}.$$

Now it is clearly seen that the ratios of the dissipation coefficients are inversely proportional to the power dissipated in the devices and is completely independent of the ambient temperature. It is important to see how this is implemented in the form suggested by FIG. 1.

The following are defined in reference to FIG. 1:
 $V_{11}$ = voltage in thermistor 11
 $V_{12}$ = voltage in thermistor 12
 $I_{11}$ = current in thermistor 11
 $I_{12}$ = current in thermistor 12
 $R_{T11}$ = resistance in thermistor 11
 $R_{T12}$ = resistance in thermistor 12
 $R_{31} = R_{65}$ $R_{29} = R_{55}$
$R_{35} = R_{63}$ $$\text{Alpha} = \frac{R_{31}}{R_{29}R_{35}} = \frac{R_{65}}{R_{55}R_{63}}$$

k=the resistor divider ratio of pot 41 at tap 39
$V_1 - kV_2 = V_E$ = error voltage fed to control loop.
Amplifiers 45 and 53 are used to keep $R_{T12}$ at a constant resistance, by feeding back the voltage across $R_{T12}$ to a current source in a fixed ratio. Starting at $V_{57}$, $$V_{57} = -V_2 R_{65}/R_{63}.$$

Since $V_{51}$ is a virtual ground and the current into the negative terminal of 45 is negligible, $$I_{12} = -V_{57}/R_{55} = V_2 \frac{R_{65}}{R_{55}R_{63}} = V_2 \text{ alpha}.$$

Using the current to voltage relationship of a resistor, $$R_{T12} = V_{12}/I_{12} = V_2/(V_2 \text{ alpha}) = 1/\text{alpha}$$

since $V_{12} = V_2$.

Hence $R_{T12}$ is fixed at 1/alpha.
The next step is the current in $R_{T11}$. Looking at 37, $$V_{37} = kV_2,$$

since $R_{41}$ is a simple resistor divider of value k. Because the resistors $R_{29}$, $R_{31}$, and $R_{35}$ are in the exact same configuration around the amplifier 23 as $R_{55}$, $R_{65}$ are around the amplifier 53, $$I_{11} = V_{37} \text{ alpha} = kV_2 \text{ alpha}$$

since $$I_{12} = V_2 \text{ alpha}.$$

Now if $V_E \to 0$ such that $$V_{19} = V_{37}$$

or $$V_1 = kV_2,$$

then $$R_{T11} = V_{11}/I_{11} = kV_2/I_{11}$$
$$= kV_2/kV_2 \text{ alpha} = 1/\text{alpha}$$

since $$I_{11} = kV_2 \text{ alpha}.$$

Thus $$R_{T11} = 1/\text{alpha} = R_{T12}$$

or $$T_{11} = T_{12}.$$

$R_{T11}$ and $R_{T12}$ are matched devices, meaning that when both devices are at a given temperature T, $R_{T11} = R_{T12}$. Therefor as the error voltage $V_E$ is driven to zero, $$T_{11} = T_{12}$$

Also under the condition that $V_E = 0$, $$P_{11} = I_{11}V_{11} = k^2 V_2^2 \text{ alpha}$$

$$P_{12} = V_2^2 \text{ alpha}.$$

Recalling $$D_{C12}/D_{C11} = P_{11}/P_{12}$$

which gives $$D_{C12}/D_{C11} = \frac{k^2 V_2^2}{V_2^2} \cdot \frac{\text{alpha}}{\text{alpha}} = k^2.$$

In a flow controller application where constant flow is the goal, fixing the ratio of dissipation coefficients is what is needed to achieve this goal. In FIG. 1 the error voltage $V_E$ is used to drive a pump which changes the dissipation coefficient of the device in the flow. The closed loop in turn drives $V_E \to 0$. Since k is fixed by the pot 41, $D_{C12}/D_{C11}$ is fixed when the loop is closed.

The final proof is to show that $V_E$ is insensitive to ambient temperature. Returning to the steady state equations, $$T_{11} = T_A + P_{11}D_{C11} \text{ and } T_{12} = T_A + P_{12}D_{C12}$$

$$P_{11} = V_{11}^2/R_{T11} \quad P_{12} = V_{12}^2/R_{T12}$$

$$T_{11} = T_A + \frac{V_{11}^2 D_{C11}}{R_{T11}} \quad T_{12} = T_A + \frac{V_{12}^2 D_{C12}}{R_{T12}}$$

$$V_{11}^2 = \frac{(T_{11} - T_A)R_{T11}}{D_{C11}} \quad V_{12}^2 = \frac{(T_{12} - T_A)R_{T12}}{D_{C12}}$$

Since $$V_E = V_{11} - kV_{12}$$

then $$V_E = \sqrt{\frac{(T_{11} - T_A)R_{T11}}{D_{C11}}} - k\sqrt{\frac{(T_{12} - T_A)R_{T12}}{D_{C12}}}$$

Taking the partial derivative with respect to $T_A$ $$\frac{\partial V_E}{\partial T_A} = \frac{-1}{2}\sqrt{\frac{R_{T11}}{D_{C11}(T_{11} - T_A)}} - k\sqrt{\frac{R_{T12}}{D_{C12}(T_{12} - T_A)}}$$

It has already been shown that if $V_E = 0$ then $R_{T11} = R_{T12}$, which implies $T_{11} = T_{12}$. Therefore $$\frac{\partial V_E}{\partial T_A} = \frac{-1}{2}\sqrt{\frac{R_T}{(T - T_A)}}\left(\sqrt{\frac{1}{D_{C11}}} - k\sqrt{\frac{1}{D_{C12}}}\right)$$

where
$R_T = R_{T11} = R_{T12}$ and
$T = T_{11} = T_{12}$.
Also previously shown was the fact that if $V_E = 0$ then $$D_{C12}/D_{C11} = k^2$$

$$D_{C12} = K^2 D_{C11}.$$

This gives:

$$\frac{\partial V_E}{\partial T_A} = \frac{-1}{2} \sqrt{\frac{R_T}{(T-T_A)}} \left( \sqrt{\frac{1}{D_{C11}}} - k\sqrt{\frac{1}{k^2 D_{C11}}} \right)$$

$$= \frac{-1}{2} \sqrt{\frac{R_T}{(T-T_A)}} \left( \sqrt{\frac{1}{D_{C11}}} - \sqrt{\frac{1}{D_{C11}}} \right) = 0$$

Thus the error voltage isnot sensitive to ambient temperature changes.

Figure 2:
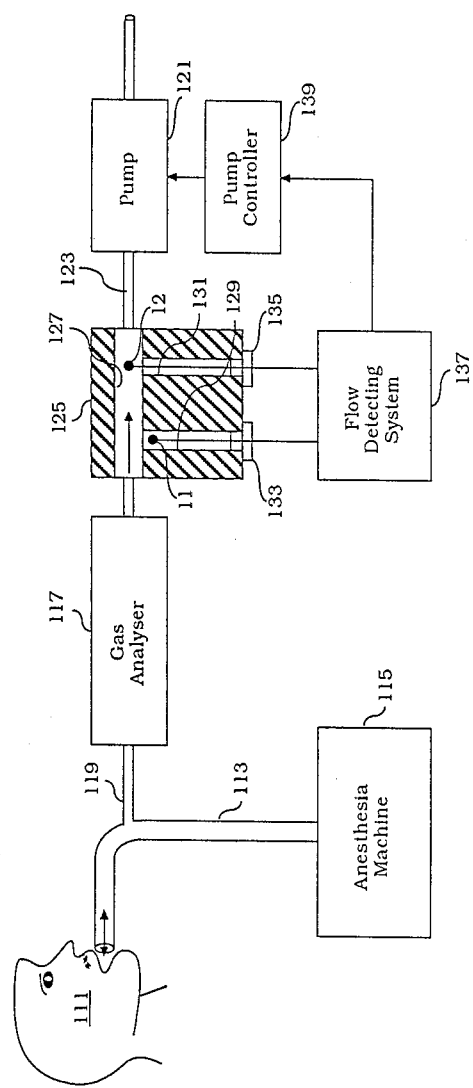
FIG. 2 is a general schematic diagram of an anesthesiology system in which the invention may be beneficially incorporated.

Referring to FIG. 2, an application of the circuit of FIG. 1 used in an anesthesiology gas monitoring system is illustrated schematically. In the system of FIG. 2, the patient is indicated at 111 wherein his airway is conducted by suitable conduits 113 to an anesthesia machine 115. Since the general methods and apparatus for maintaining patients under anesthesia are well know to those skilled in the art, further description is not given here.

An anesthetic agent gas analyzer 117 is shown connected via a tap conduit 119 to the conduit 113. A flow of gas through the conduit 119 for analysis by the gas analyzer 117 is maintained by a pump 121 connected to the gas via a conduit 123. Gas analyzers for monitoring anesthetic agents are well known in the art and therefore will not be further described herein. An anesthetic agent analyzer suitable for use as the analyzer 117 is shown and described in U.S. Pat. No. 4,480,190.

The thermistors 11 and 12 are positioned as shown in FIG. 2 so that the thermistor 11 is out of the flow of gas but is still subject to ambient temperature sensitivity. The thermistor 12 is positioned in the flow of gas. To accomplish this, an aluminum block 125, having an internal passage 127 therein is aligned in the conduit 123 so that fluid flow passes through the passage 127. A pair of holes 129 and 131 are bored through the block and are suitably sealed by threaded caps 133 and 135, respectively. The thermistor 11 is positioned in the hole 129 recessed from the passage 127, whereas the thermistor 12 is mounted to extend past the hole 131 and into the board 127.

The circuit of FIG. 1 is generally indicated in the block 137 and is connected to a suitable flow controller 139 which operates the pump 121. The flow controller 139 may be of any suitable construction known to those skilled in the art and is responsive to an error voltage between the terminals 19 and 37 in FIG. 1 to produce an error voltage. This error voltage is used to control the speed of the pump 121 to thus servo the fluid flow rate in the conduit 123 and hence in the conduit 119. By maintaining the voltage difference at zero, this results in a constant flow rate through the anesthetic agent analyzer 117.

The system of the invention may be used to provide for measurement of flow velocity of a fluid in which the thermistor 12 is disposed. Referring to FIG. 3, the circuit of FIG. 1 is shown appropriately modified in a manner to provide for flow measurement rather than flow servo control. In the circuit of FIG. 3, the resistor 41 and tap 39 are replaced with an NPN transistor 201. The emmiter of the transistor is coupled to the positive input 43 of the amplifier 45, and the collector is coupled to the collector is coupled to the terminal 37. An operational amplifier 203 has its output 205 coupled to drive the base of the transistor 201. The negative input of 207 of the amplifier 203 is coupled to the terminal 19 and the positive input 209 of the amplifier 203 is coupled to the terminal 37. A resistor 211 is connected between the collector of the transistor 201 and the terminal 49.

The net result of the configuration shown in FIG. 3 is that the transistor 201 provides communication between the two servo loops controlling the thermistors 11 and 12. If the temperatures of the thermistors are held constant by the servo loops, the transistor 201 will change the value of k. Although k is not in a linear relationship with the flow, a suitable digital conversion circuit with look-up table, not shown, may be utilized to provide the necessary calibration between flow rate and the change in k resulting from operation of the transistor 201. Such circuits are well known to those skilled in the art.

It may be seen, therefore, that the invention provides a flow transducer that is insensitive to ambient temperature. Dual matched thermistors are held at the same temperature, one in the flow stream and one out of the stream. The ratio of the powers in the respective thermistors is proportional to the flow rate and will not change with changes in ambient temperature. The invention is applicable to the use of any temperature sensitive device, not just thermistors. In addition, the invention is applicable to flow measurement and control, to any situation where a change in dissipation coefficients of the temperature sensitive devices provides information about a medium. Other applications include vacuum gauges, gas chromatography, and voltage control.

Various modifications of the invention in addition to those shown and described herein will become apparent to those skilled in the art from the foregoing description and accompanying drawings. Such modifications are intended to fall within the scope of the appended claims.

What is claimed is:

1. A method for detecting fluid flow comprising, a pair of electrically heated matched temperature sensitive devices, one of said devices being positioned in the flowing fluid to be measured and one of said devices being positioned out of the fluid flow at a thermal reference location wherein a change in the flow rate results in change in the ratio of dissipation coefficients of said devices, a method for indicating the change in the ratio of dissipation coefficient which is insensitive to variation in ambient temperature, said method comprising, maintaining the temperature of the two devices substantially equal, and detecting changes in the ratio of the power dissipation in one device with respect to the power dissipation in the other, wherein a change in said power dissipation ratio indicates a change in the dissipation coefficient ratio.

2. A method according to claim 1 wherein each of said temperature sensitive devices comprises a thermistor.

3. A method according to claim 1 wherein the temperature of the two devices are maintained substantially equal by closed loop control of their current.

4. A method according to claim 3 wherein the devices are heated by means of two voltage controlled current sources and by deriving an error voltage to maintain the temperature in said devices substantially equal.

5. A system for detecting fluid flow comprising, a pair of electrically heated matched temperature sensitive devices, one of said devices being positioned in the flowing fluid to be measured and one of said devices being positioned out of the fluid flow at a thermal reference location wherein a change in the flow rate results in change in the ratio of dissipation coefficients of said devices, means for indicating the change in the ratio of dissipation coefficients which are insensitive to variation in ambient temperature, said indicating means comprising, means for maintaining the temperature of the two devices substantially equal, and means for detecting changes in the ratio of the power dissipation in one device with respect to the power dissipation in the other wherein a change in said power dissipation ratio indicates a change in the dissipation coefficient ratio.

6. The system of claim 5 wherein each of said temperature sensitive devices comprises a thermistor.

7. The system of claim 5 wherein said temperature maintaining means comprise a closed loop for controlling the current to said devices.

8. A measuring system according to claim 7 wherein said temperature maintaining means comprise, a pair of voltage controlled current sources, and means for deriving an error voltage to maintain the temperature in said devices substantially equal.

9. A fluid flow detecting system comprising, a pair of electrically heated matched temperature sensitive devices, one of said devices being positioned in the flowing fluid to be measured and one of said devices being positioned out of the fluid flow at a thermal reference location, wherein a change in the flow rate results in a change in the ratio of dissipation coefficients of said devices, means coupled to each of said devices for maintaining said two devices at substantially equal temperature, and means for detecting changes in the ratio of the power dissipation in one device with respect to the power dissipation in the other, wherein a change in said power dissipation ratio indicates a change in the dissipation coefficient ratio which is insensitive to variation in ambient temperature.

10. A system according to claim 9 wherein each of said wherein each of said temperature sensitive devices comprises a thermistor.

11. A system according to claim 9 wherein said temperature maintaining means comprise a closed loop for controlling the resistance of said devices.

12. A system according to claim 11 wherein said temperature maintaining means comprise, a pair of voltage controlled current sources, and means for deriving an error voltage to maintain the temperature in said devices equal.

13. In an anesthesiology system in which a pump provides a flow of gases to a gas analyzer, a servo system for controlling the flow rate of the pump, said servo system including a pair of electrically heated matched temperature sensitive devices, one of said devices being positioned in the flowing gases to the gas analyzer and one of said devices being positioned out of the gas flow at a thermal reference location, means coupled to each of said devices for maintaining said two devices at substantially equal temperature, means for detecting the ratio of the power dissipation in one device with respect to the power dissipation in the other, wherein a change in said power dissipation ratio indicates a change in the dissipation coefficient ratio which is insensitive to variation in ambient temperature, and means responsive to the detected ratio for controlling the pump rate to maintain a constant flow rate.

14. A system according to claim 13 wherein each of said temperature sensitive devices comprises a thermistor.

15. A system according to claim 13 wherein said temperature maintaining means comprise a closed loop for controlling the current in said temperature sensitive devices.

* * * * *

UNITED STATES PATENT AND TRADEMARK OFFICE
CERTIFICATE OF CORRECTION

PATENT NO. : 4,756,670
DATED : July 12, 1988
INVENTOR(S) : Christopher G. Arai

It is certified that error appears in the above-identified patent and that said Letters Patent is hereby corrected as shown below:

Column 7, line 15, "isnot" should be --is not--.

Column 7, line 67, after "201" insert --and resistor 211--.

Column 8, line 1, delete "to the collector is coupled".

Column 6, line 3, "Therefor" should be --Therefore--.

Column 7, line 23, "know" should be --known--.

Column 7, line 55, "servo" should be --serve--.

Column 10, line 4, after "9" delete "wherein each of said".

Signed and Sealed this

Twenty-eighth Day of February, 1989

*Attest:*

DONALD J. QUIGG

*Attesting Officer*   *Commissioner of Patents and Trademarks*